Dec. 4, 1923.
C. B. GRAY
1,476,246
MACHINE FOR CUTTING SHEET FORM MATERIAL
Filed March 9, 1920     5 Sheets-Sheet 1
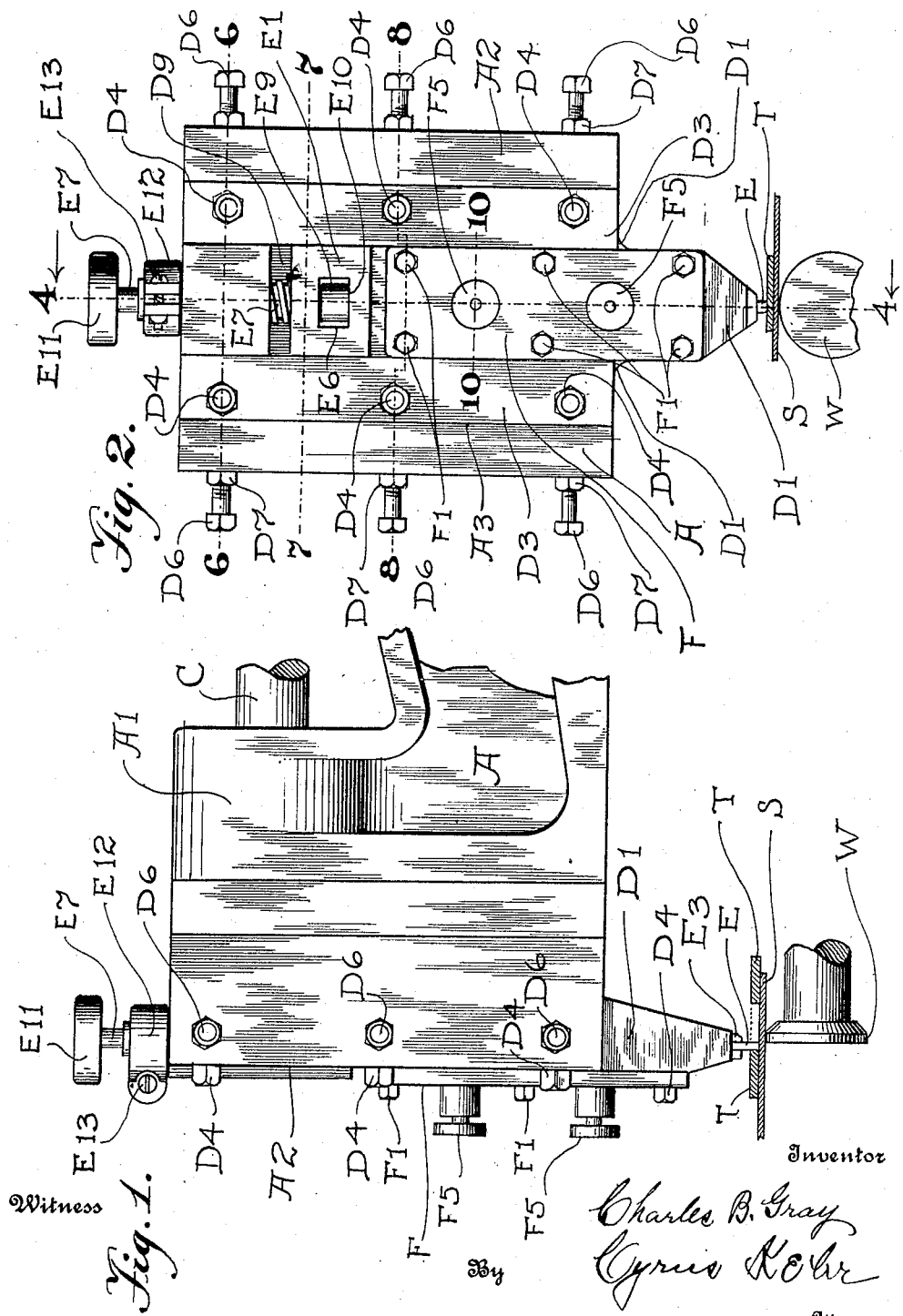
Inventor
Charles B. Gray
By Cyrus Kehr
Attorney Dec. 4, 1923.   1,476,246
C. B. GRAY
MACHINE FOR CUTTING SHEET FORM MATERIAL
Filed March 9, 1920   5 Sheets-Sheet 2

Inventor
Charles B. Gray
By Cyrus Kehr
Attorney

Witness

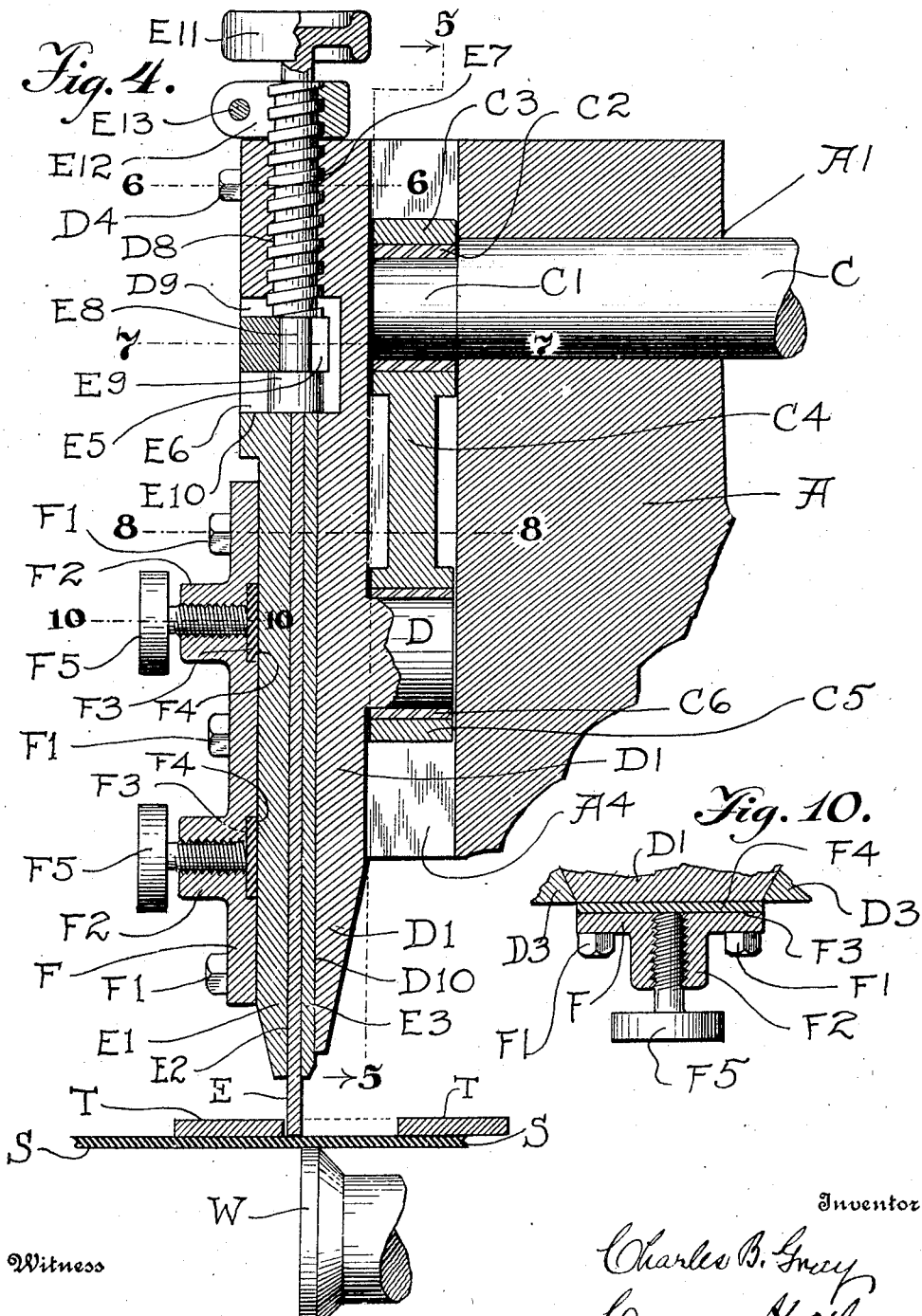

Dec. 4, 1923.  1,476,246
C. B. GRAY
MACHINE FOR CUTTING SHEET FORM MATERIAL
Filed March 9, 1920   5 Sheets-Sheet 4
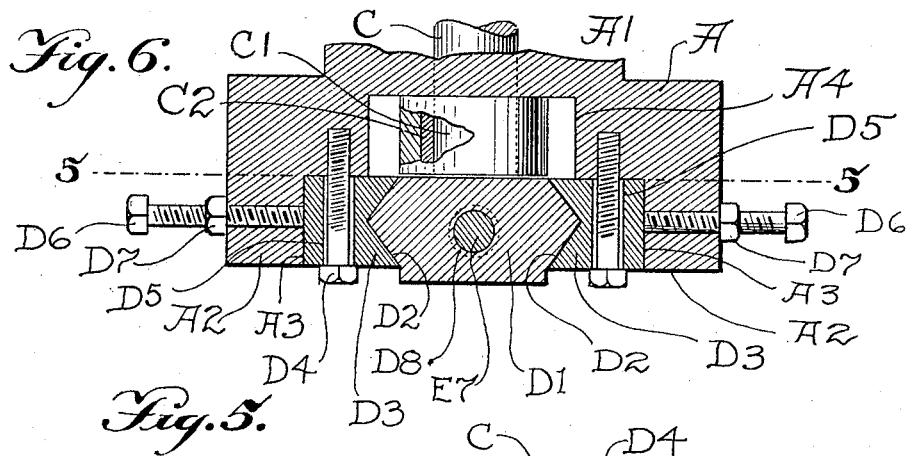
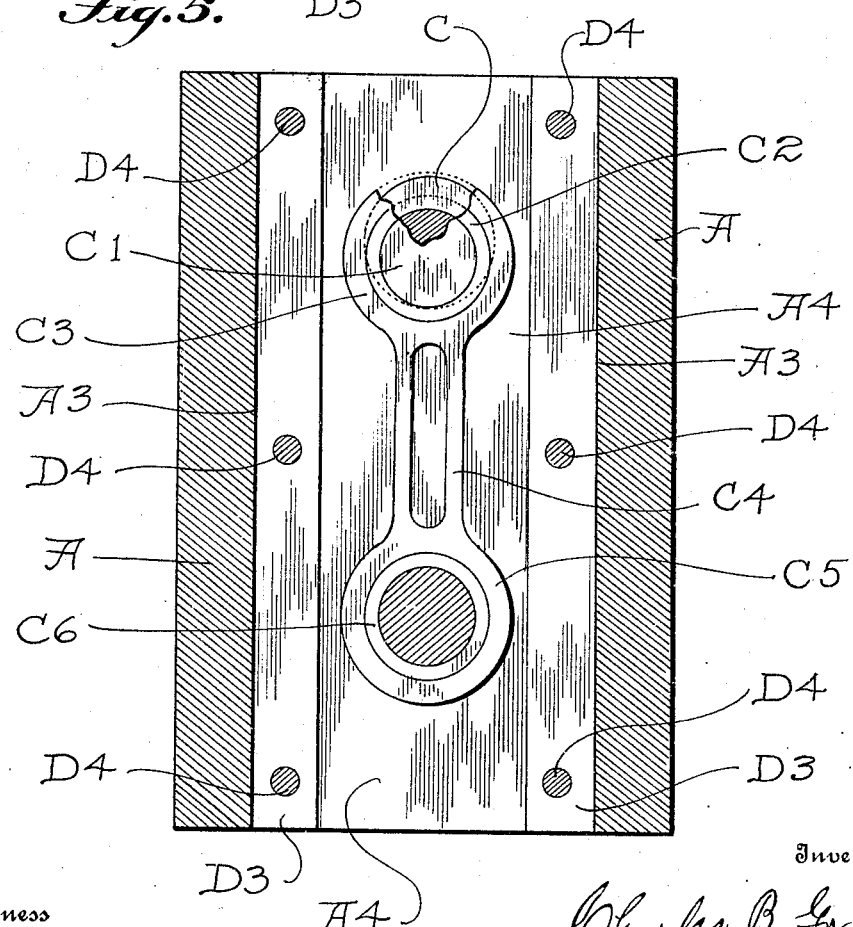

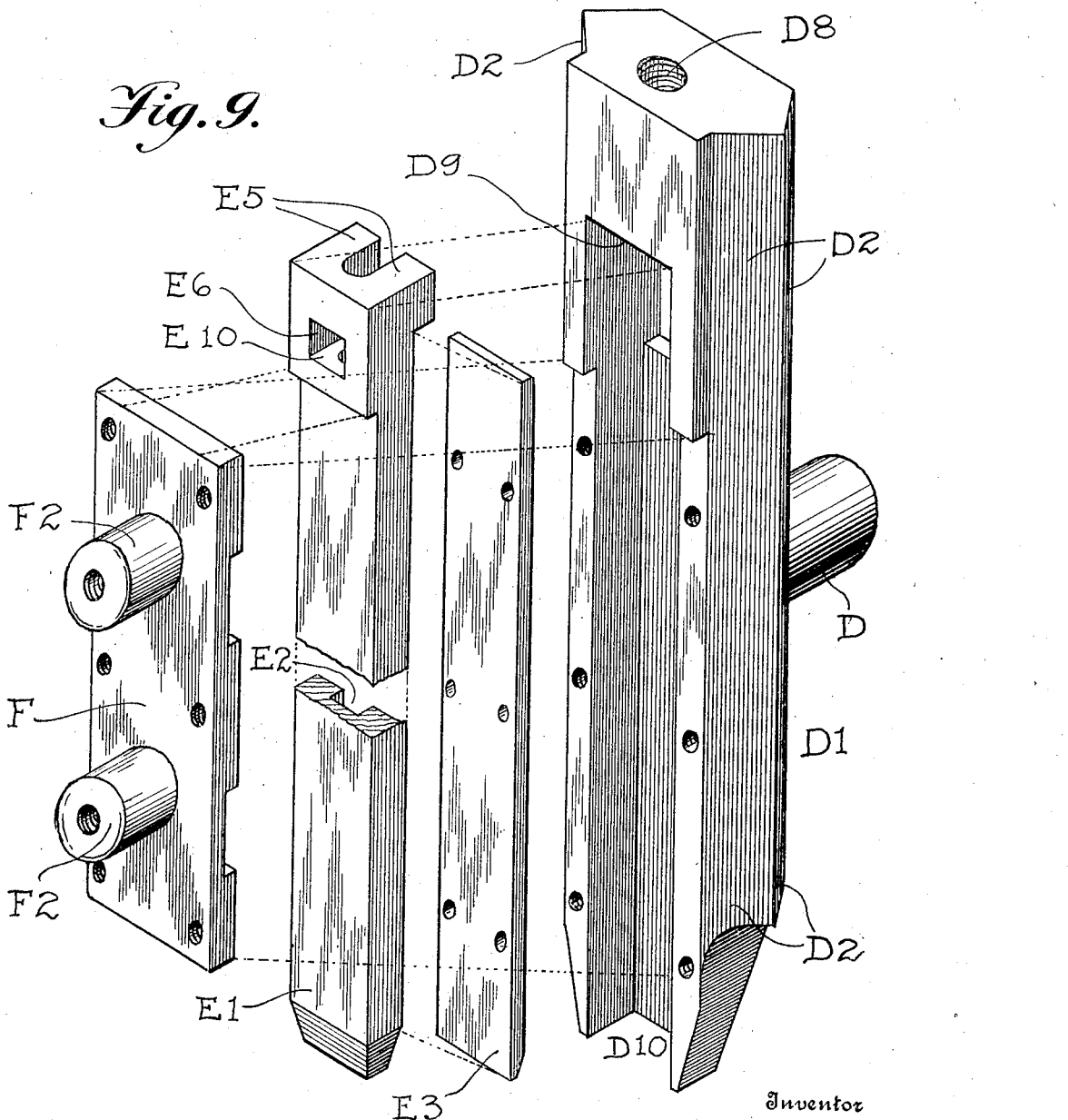

Patented Dec. 4, 1923.

1,476,246

UNITED STATES PATENT OFFICE.

CHARLES B. GRAY, OF PHILADELPHIA, PENNSYLVANIA.

MACHINE FOR CUTTING SHEET-FORM MATERIAL.

Application filed March 9, 1920. Serial No. 364,535.

*To all whom it may concern:*

Be it known that I, CHARLES BAXTER GRAY, a citizen of the United States, residing at Philadelphia, in the county of Philadelphia and State of Pennsylvania, have invented a new and useful Improvement in Machines for Cutting Sheet-Form Material, of which the following is a specification, reference being had to the accompanying drawing.

This improvement relates particularly to machines for cutting sheet-form material in which machines the chief cutting element is a reciprocatory cutter located above and perpendicular to the sheet plane and reciprocated by power mechanism. For machines of this type reference is made to my former United States Patents, No. 1,098,376 and No. 1,098,377, both granted June 2, 1914.

The object of this invention is to provide improved means for accurately securing and adjusting the reciprocatory cutter and to provide convenient means for temporarily raising the reciprocatory cutter higher than the upper surface of the sheet which is to be cut, in order that a pattern or templet may be secured on the upper face of the sheet to be cut and used as a guide for the cutting. When provision has been made for thus raising the reciprocatory cutter, a pattern having an interior space within which cutting is to be done may easily be put into position without disturbing the working adjustment of said cutting, the mechanism concerned in temporarily lifting the cutter so constructed as to permit returning the cutter to precisely its working position in the support for the cutter.

In the accompanying drawings,

Fig. 1 is an elevation of parts of the front of a machine embodying my improvement;

Fig. 2 is an elevation looking toward the right as shown in Fig. 1;

Fig. 4 is an upright section on the line, 4—4, of Fig. 2, looking toward the left;

Fig. 5 is an upright section on the line, 5—5, of Figs. 4 and 6, looking in the direction of the arrow;

Fig. 6 is a horizontal section on the line, 6—6, of Fig. 4;

Fig. 9 is a perspective of four members of the mechanism whereby the upper cutter is reciprocated, said members being separated from each other and placed in position to indicate their relation to each other;

Fig. 10 is a horizontal section on the line, 10—10, of Figs. 2 and 4.

Figure 3:
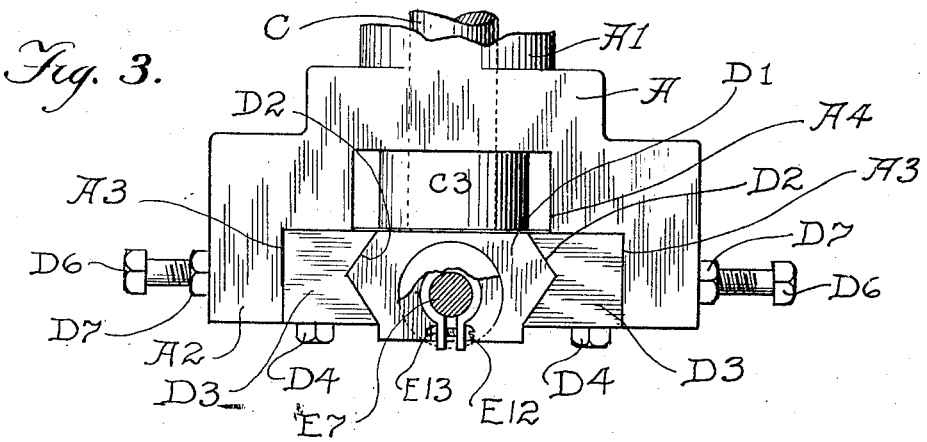
Fig. 3 is a plan of the mechanism shown by Figs. 1 and 2, parts being broken away.
Figure 7:
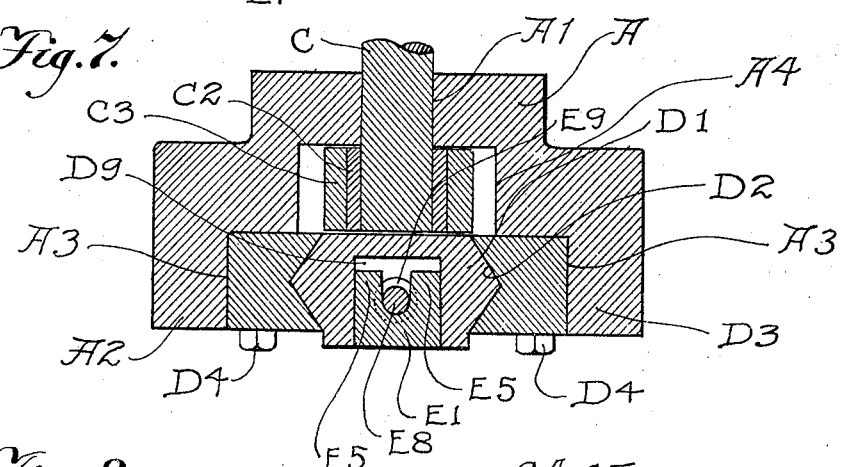
Fig. 7 is a horizontal section on the line, 7—7, of Figs. 2 and 4.
Figure 8:
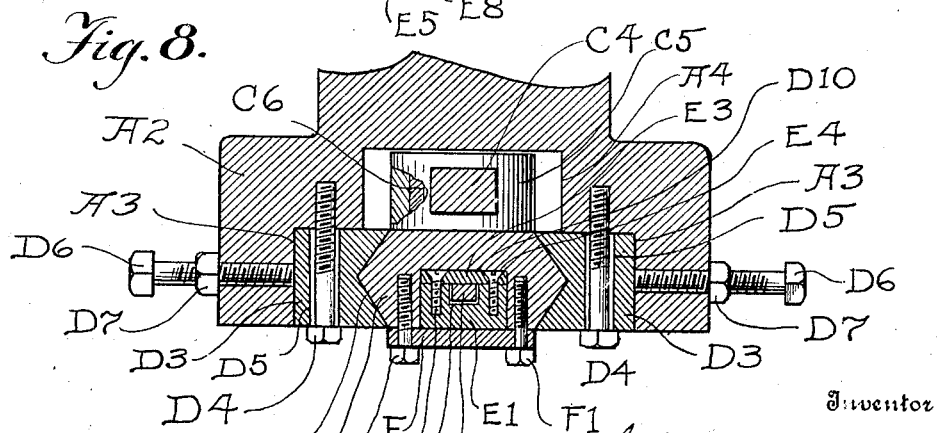
Fig. 8 is a horizontal section on the line, 8—8, of Figs. 2 and 4.

Referring to said drawings, A is a part of the upper arm, of the body of the machine. $A^1$ is a horizontal bearing on the arm, A. In said bearing rests the left hand end of the upper drive shaft, C. The right hand end of said shaft rests in another bearing also supported by the body of the machine, but not shown in the drawing. The left hand end of the arm, A, has an upright face, $A^2$, which is perpendicular to the shaft, C. Along said face is an upright channel or recess, $A^3$. At the right of said channel is a narrower channel, $A^4$. Both of said channels have upright side faces which are parallel to each other and to the face, $A^2$, and the shaft, C. The shaft, C, extends through the channel, $A^4$, to the channel, $A^3$; and this part, $C^1$, of the shaft in the channel, $A^4$, is eccentric and surrounded by a bushing, $C^2$, and said bushing is surrounded by the bearing, $C^3$, of a pitman, $C^4$. On the lower end of said pitman is a bearing, $C^5$, in which is a bushing, $C^6$. Within said bushing is a wrist, D, on the reciprocatory cross-head, $D^1$. The front and the rear of said head has oblique faces, $D^2$, approaching each other from the right and from the left and extending away from the axis of the head. At the front and at the rear of said head a track bar, $D^3$, is inserted in the channel, $A^3$. The faces of said bars which are adjacent the head are grooved to fit the upright inclined faces of the head. Cap screws, $D^4$, extend through horizontally elongated holes, $D^5$, and into the end of the arm, A, to bind said bars immovably to said arm. Cap screws, $D^6$, are placed horizontally and parallel to the face, $A^2$, through the arm, A, to bear against the faces of the track bars, $D^3$, which are opposite the grooved part of the track bars. On each of said cap screws is a jam nut, $D^7$, which is to bear against the adjacent face of the arm, A, when the cap screw, $D^6$, has been put into the desired position. When the cap screws, $D^4$, have been loosened, the cap screws, $D^6$, may be turned forward or backward to make horizontal adjustment of the track bars to effect the desired engagement with the oblique faces of the cross-head, $D^1$. It will now be seen that the reciprocation of the cross-head is effected by the rotation of the shaft, C, and its eccentric, $C^1$, whereby the pitman, $C^4$, is actuated so as to raise and lower the wrist, D, of the cross-head.

The reciprocatory cutter, E, works in conjunction with the lower cutting members which may include a cutting and feeding wheel, W, such as is shown in my above-mentioned patents and by Figs. 1 and 4, of the drawings accompanying this specification. The parts associated with the cutter, E, for supporting said cutter adjustably in the reciprocatory cross-head will now be described. In the form shown in the drawings, said cutter is rectangular in cross section, although it may be of some other form. The upper part of the head, $D^1$, has an upright interiorly screw threaded bore, $D^8$, the lower end of which opens into a recess, $D^9$. Below the recess, $D^9$, the entire outer or left hand face of the head is cut away from said recess to the extreme lower end to make room for seating a face plate to be described further on. In the new face thus formed is an upright channel, $D^{10}$, which receives the holder and the back plate, $E^3$.

The holder is rectangular in cross section and fits slidably into the channel, $D^{10}$, of the cross-head. On the inner or right hand face of the holder is a channel, $E^2$, of proper cross section to receive the cutter, E, and make the left hand face of the cutter and the left hand face of the holder nearly flush with each other, the cutter projecting slightly out of said channel. At the right of the holder is the back plate, $E^3$. Screws, $E^4$, extend through said plate into the holder to bind the plate to press against the cutter and the holder.

The upper end of the holder extends into the recess, $D^9$, of the cross-head and also toward the left to give greater thickness to the part of the holder which is within said recess. At its upper end the holder has two horizontal lugs or arms, $E^5$, extending toward the right at the same elevation and separated by a space, the left hand part of which is in alignment with the bore, $D^8$, of the cross-head. Immediately below said lugs, an aperture, $E^6$, extends through the holder from right to left. In the interiorly screw threaded bore, $D^8$, is a screw shaft, $E^7$, which has at its lower end a neck, $E^8$, which rests between the lugs, $E^5$, and below said neck. A head, $E^9$, which bears upward against the lugs, $E^5$, and downward against the face, $E^{10}$, of the holder which is below the channel, $E^2$, and upon the upper end of the back face plate, $E^3$. When the screw shaft, $E^7$, is turned to move it endwise, the head, $E^9$, on said shaft forces the holder, $E^1$, endwise, in the same direction. Thus the holder and the cutter may be moved up or down while the cross-head, D, is stationary. On the upper end of the screw shaft is a hand wheel, $E^{11}$, to be grasped by the hand of the operator for turning said shaft. Immediately above the upper end of the cross head, the screw shaft is surrounded by a split collar, $E^{12}$, which is interiorly screw threaded to fit the threads of the screw shaft. A screw, $E^{13}$, extends horizontally through the two ends of the collar and serves to draw said ends to each other to immovably bind the collar on the shaft.

A face plate, F, is placed across the right hand or outer face of the cross-head from the lower end of said head upward nearly to the recess, $D^9$. Cap screws, $F^1$, extend through the face plate, F, into the cross-head at each side of the holder for binding the face plate immovably to the cross-head, the cross section of the holder and the back plate, $E^3$, being small enough to allow endwise reciprocation of the holder and said plate. On the outer or right hand face of the face plate, F, are bosses, $F^2$. Opposite each boss the inner face of the cap plate is provided with a recess, $F^3$, in which lies a binding plate, $F^4$. A screw, $F^5$, extends horizontally through each boss, $F^2$, and bears against the adjacent binding plate. By driving said screws forward, said plates can be driven closer to the holder, $E^1$, to better confine the latter for accurate up-and-down movement.

In assembling the parts, the reciprocatory cutter, E, is put into position between the holder, $E^1$, and the inner face plate, F, the lower end of the cutter being placed at approximately the proper height when the cross-head is in its lower position. Then the screws, $F^1$, are adjusted. Then the collar, $E^{12}$, is loosened on the screw shaft by turning the screw, $E^{13}$. Then the screw shaft is turned to move the holder up or down as may be required to bring the lower end of the cutter precisely into the required position. Then the screws, $F^5$, are adjusted.

When this adjustment, by means of the screw shaft, $E^7$, has been made, the collar, $E^{12}$, is to be turned downward to bring it into contact with the upper face of the cross-head. When that has been done, the screw, $E^{13}$, is to be turned to tighten the collar immovably on the screw shaft. Thereafter, if it is required to temporarily raise the reciprocatory cutter above the sheet, S, and also above the templet, T, it is only necessary to loosen the screws, $F^5$, and then turn the screw shaft, $E^7$, in the proper direction to raise said shaft and the holder, $E^1$, until the lower end of the cutter, E, is above the templet. After the templet has been moved horizontally beneath the cutter so as to allow the cutter to enter an opening in the templet, the screw shaft is to be turned in the downward direction as far as the collar, $E^{12}$, permits. Thus the holder and the cutter are returned to the precise working position previously determined. Then the screws, $F^5$, are again turned inward to drive the binding plates, $F^4$, against the holder.

It will be observed that the head, $E^9$, of the screw shaft bears against the upper end of the cutter, E, as well as against the adjacent horizontal face of the holder and the inner face plate. Thus said head forms an abutment for the upper end of the cutter. Since the length of the cutter, if it is long enough to reach to the upper end of the holder, may vary, the holder is to be adjusted up and down to compensate for variation in length of the cutter. Thus a precise length of the cutter is made unnecessary, for compensation for variation in length may easily be made. Furthermore, if the length of the cutter is less than the distance from the sheet plane to the upper end of the back or inner face plate, $E^3$, filler sections of metal of approximately the same cross section as the cutter may be put into the cutter space above the cutter; and these filler sections need not be of precise lengths. If such a filler is a little too long or a little too short, the cutter is moved endwise to bring the upper end of the filler into position. Then the holder is moved endwise by means of the screw shaft, $E^7$, to bring the lower end of the cutter into precise working position, and the screw shaft is then secured by tightening the collar, $E^{12}$, and the screws, $F^5$, as already described.

I claim as my invention,

1. In a machine of the nature described, the combination of a cross-head, guide-ways for confining said cross-head for reciprocation, means for reciprocating said cross-head, a tool holder supported on the cross-head, a screw shaft for adjusting the holder parallel to the path of reciprocation of the cross-head, an adjustable stop for limiting downward movement of the screw shaft, and a cutting tool supported by said holder, substantially as described.

2. In a machine of the nature described, the combination of a cross-head, guide-ways for confining said cross-head for reciprocation, a pitman for reciprocating said cross-head, a tool holder supported on the cross-head, a screw shaft for adjusting the holder parallel to the path of reciprocation of the cross-head, an adjustable stop for limiting downward movement of the screw shaft, and a cutting tool supported by said holder, substantially as described.

3. In a machine of the nature described, the combination of a cross-head channeled from near its upper end downward, a holder resting in the channel of the cross-head, an upright screw shaft extending downward through the part of the cross-head which is above the channel of the cross-head, the lower end of said screw shaft and the upper end of said holder being formed for inter-engagement permitting turning of the screw shaft and compelling the holder to move upward and downward in unison with the screw shaft, substantially as described.

4. In a machine of the nature described, the combination of a cross-head channeled from near its upper end downward, a holder resting in the channel of the cross-head, an upright screw shaft extending downward through the part of the cross-head which is above the channel of the cross-head, the lower end of said screw shaft and the upper end of said holder being formed for inter-engagement permitting turning of the screw shaft and compelling the holder to move upward and downward in unison with the screw shaft, and an adjustable stop on the screw shaft for limiting the downward movement of the screw shaft, substantially as described.

In testimony whereof I have signed my name, this 3rd day of March, in the year one thousand nine hundred and twenty.

CHARLES B. GRAY.